UNITED STATES PATENT OFFICE.

FREDERIC J. FALDING, OF NEW YORK, N. Y., ASSIGNOR OF ONE-HALF TO WILLIAM RICHARD CATHCART, OF MAYWOOD, NEW JERSEY.

PROCESS OF UTILIZING BY-PRODUCT METALLIC SALTS AND AMMONIACAL LIQUOR.

961,764.

Specification of Letters Patent. Patented June 21, 1910.

No Drawing. Application filed February 26, 1906. Serial No. 302,915.

*To all whom it may concern:*

Be it known that I, FREDERIC J. FALDING, a citizen of the United States, residing at New York city, county of Kings, and State of New York, have invented certain new and useful Improvements in Processes of Utilizing By-Product Metallic Salts and Ammonia, fully described and represented in the following specification and the accompanying drawings, forming a part of the same.

This invention relates to a process for making sulfate and muriate of ammonia, or other salts of ammonia, and recovering the values from waste pickling liquor resulting from the washing of iron and steel in a weak acid solution and from gas liquor resulting from the washing or scrubbing with water of gas produced by the distillation of coal and other organic matter.

In preparing steel or iron sheets, tubes, wire, castings, forgings, etc., for galvanizing or tinning, or simply for the purpose of cleaning such sheets, etc., a weak aqueous solution of acid is used, usually sulfuric acid, sometimes hydrochloric or other acid. The various oxids of iron formed on the steel and iron from the contact of the hot metal with air and moisture, together with some of the metal itself, go into solution with the acid and water as ferrous and ferric sulfate if sulfuric acid is the acid used, or as ferrous and ferric chlorids if hydrochloric acid is used. Fresh acid may be added to this pickling liquor, as it is called, until the liquor becomes too dirty for further use, when it must be replaced in part or in whole by a fresh acid solution. The old solution, known as waste pickling liquor, then constitutes a waste product containing iron salts with some free acid. Heretofore the only use found for this waste liquor has been to add scrap iron until the solution is entirely neutral and to concentrate and recover the iron salts or to precipitate the iron by means of lime. These products are valuable principally for the production of paint materials, but their use is strictly limited and their production is costly. These liquors, therefore, have heretofore been mainly run to waste involving the loss of large quantities of acid, iron and water. This waste also constitutes a nuisance difficult to dispose of.

The gas liquor above referred to is also largely at the present day a by-product of the metallurgy of iron and steel. The most valuable constituent of such gas liquor is ammonia, and such gas liquor forms the principal source of the supply of ammonia in its various forms. Other recoverable values which it contains are sulfur and cyanogen and chlorin in various forms, sulfur being the most important as it is present in more considerable though varying quantities. These substances, ammonia, sulfur, cyanogen and chlorin, are contained in the gases produced by the distillation or combustion of coal and other organic matter, and are separated from the gases in the process of purifying them. This purification is usually accomplished by scrubbing the gas with water, the water cooling the gas and taking from it these and other substances which constitute impurities in the gas, and carrying away also the tar and empyreumatic vapors. The tar mostly settles out of the wash water by gravity, and the wash water, which then contains from 1% to 5% of ammonia in various forms is called crude gas liquor, and from this crude the ammonia is recovered. The recovery of the ammonia involves the addition to the gas liquor of a chemical substance for breaking up the fixed ammonia compounds. Lime has been almost universally used heretofore for this purpose. In this process a large excess of lime over the amount theoretically required is used, and the lime retains the sulfur and some of the ammonia together with valuable cyanids and forms troublesome crusts in the apparatus used; and not only this but the remaining waste lime liquor constitutes a troublesome nuisance difficult to dispose of. The cost of producing ammonia in this way has been such as to limit its use to a large extent. In the production of sulfate of ammonia especially, the principal use of which is as a fertilizer, the cost, which includes the addition of sulfuric acid to the ammonia, has been such as to practically prevent its use for this purpose to anything like the extent to which it would be used if the cost of production were lower.

Formerly nearly the whole supply of gas liquor for the production of ammonia was derived from gas works, or from gas produced in the manufacture of bone black. In later years the adoption of by-product coke ovens for producing coke for metallurgical purposes has opened up a vastly greater and rapidly increasing source of supply of ammonia in the waste gas liquors resulting from the scrubbing of gas from such by-product coke ovens. Gas from blast furnaces also forms a potential source of ammonia, although such gases have heretofore in this country usually been allowed to go to waste or have been employed as fuel, &c., without attempting to recover the other values contained in them. Ammonia is thus likely to become in this country almost entirely a by-product of the metallurgy of iron and steel. The iron and steel industry is therefore faced with the difficulty of disposing of large quantities of waste pickling liquor which constitutes a nuisance, while at the same time it is wasting large quantities of iron and sulfuric or hydrochloric acid contained in such waste pickling liquors. It is also producing large quantities of crude gas liquor, the recovery of values from which involves the waste of large quantities of lime and the creating of a nuisance. Moreover the methods heretofore employed are such that the values are not completely recovered and much of the ammonia, cyanogen and sulfur are lost. A further element of loss lies in the fact that the processes for recovering ammonia and other values from the gas liquor are usually not carried out by the producers of the gas liquor, but at chemical works usually distant from the place of production, thus involving the expense of transportation of large quantities of liquor containing relatively small percentages of recoverable values. A process of concentration is sometimes carried out at the place of production, but this is a comparatively costly process and involves the use of lime and the formation of a waste liquid which is of such a character as to constitute a nuisance and to be difficult to dispose of.

The object of the present invention is to provide an improved process for recovering the values contained in these two by-products of the metallurgy of iron and steel, that is, the waste pickling liquor and crude gas liquor, whereby the ammonia from the gas liquor and the acid from the pickling liquor will be recovered in the form of an ammonium salt (sulfate of ammonia if sulfuric acid were used for pickling, muriate of ammonia if hydrochloric acid were used, &c.,) and the ammonia will be more completely recovered from the gas liquor than was possible by the old processes; and whereby iron from the pickling liquor will be recovered in a form suitable for metallurgical and other purposes; and whereby the waste of lime in the treatment of the gas liquor and the creation of a nuisance thereby will be avoided; and whereby the nuisance constituted by the waste pickling liquor will be abated.

To these ends the invention consists generally in combining these two waste liquors so that the acid combined with the iron in the pickling liquor may leave the iron and unite with the alkaline base, the ammonia, contained in the gas liquor to form an ammonium salt, (ammonium sulfate if sulfate pickling liquor is used, ammonium chlorid if chlorid pickling liquor is used, &c.,) and the iron will be precipitated, either as hydroxid or in combination with the sulfur, cyanogen, chlorin and other impurities which may be contained in the gas liquor. The ammonium salt thus formed being soluble will remain in solution in the mixture, and the two products, the ammonium salt and the precipitated iron compounds may readily be separately recovered.

The invention will now be described more in detail, supposing the waste pickling liquor employed to be of the sulfate form. This liquor consists as before stated principally of a dilute solution of ferrous sulfate, $FeSO_4$, with some free sulfuric acid. Ferric sulfate, $Fe_2(SO_4)_3$, is also present with various minor impurities. The process is based upon the following re-actions:—If ammonia, $NH_3$, is added to a solution of ferrous sulfate, the following re-action will take place.

(1) $2NH_4OH$ (or $2NH_3 + 2H_2O$) $+$
$FeSO_4 = (NH_4)_2SO_4 + Fe(OH)_2$.

The ammonium sulfate will remain in solution and the ferrous hydrate will be only partially precipitated, it being soluble in the presence of the ammonium salt. If the solution is subjected to the action of an oxidizing agent, as by passing a current of air through it while heated, the ferrous hydrate will be converted into ferric hydrate or some intermediate oxidation product or a mixture of such products: for example (2) $2Fe(OH)_2 + H_2O + O = Fe_2(OH)_6$ and—

$3Fe(OH)_2 + O = Fe_3O_2(OH)_4 + H_2O$.

These ferric and ferroso-ferric hydrates are insoluble in the presence of ammonium salts and therefore precipitate completely.

If a solution of ferrous sulfate containing sulfuric acid is oxidized by air or other oxidizing agent with heat, the ferrous sulfate will be converted into ferric sulfate.—

(3) $2FeSO_4 + H_2SO_4 + O =$
$Fe_2(SO_4)_3 + H_2O$, and if ammonia be then added to the oxidized solution the following re-action will take place.

(4) $6NH_4OH$ (or $6NH_3 + 6H_2O) + Fe_2(SO_4)_3 = Fe_2(OH)_6 + 3(NH_4)_2SO_4$.

Ferric hydrate combined with ammonium sulfid produces ferrous sulfid together with ammonium hydrate and free sulfur.

(5) $Fe_2(OH)_6 + 3(NH_4)_2S = 2FeS + 6(NH_4)OH + S$ or—

$Fe_2(OH)_6 + 3H_2S + 6NH_3 = 2FeS + 6NH_3 + 6H_2O + S$.

In a freshly precipitated solution, ferrous sulfid suffers dissociation as follows.

(6) $FeS + 2H_2O = Fe(OH)_2 + H_2S$.

(7) $Fe(OH)_2 + H_2S + O = Fe_2(OH)_6 + S$.

Ferrous sulfid in the presence of an oxidizing current of air becomes ferrous sulfate, or if sufficiently oxidized it becomes ferric sulfate, $Fe_2(SO_4)_3$.

(8) $FeS + 2O_2 = FeSO_4$.

Sulfur contained in ammonium sulfid may thus be recovered as ammonium sulfate by the re-action shown by equation 1.

To make practical use of these re-actions in accordance with the present invention, the gas liquor is preferably first freed from its sulfids. For this purpose there is preferably added to a given volume of gas liquor just sufficient of the pickling liquor to produce according to the re-actions above given enough ferric or ferrous hydroxid to precipitate the sulfur as iron sulfid and free sulfur. Instead of the pickling liquor (ferrous sulfate solution), ferrous hydroxid, or preferably ferric hydroxid, previously obtained by this process or otherwise may be used for this purpose. This step of the process may be carried out either with or without heat and oxidation as may be necessary and according to the solution of iron salt employed. The precipitate will carry down some of the tarry matters of the gas liquor, and cyanogen and chlorin and compounds of the same contained in the gas liquor will be precipitated, and the precipitate may be further treated for recovering the sulfur and cyanogen and chlorin values together with iron hydroxid. To the volume of gas liquor now freed from sulfids, cyanids and chlorids, a corresponding volume of the waste pickling liquor containing the necessary equivalent of sulfuric acid to combine with the ammonia contained in the volume of gas liquor in accordance with the re-actions 1 and 4 above stated, is added, and the mixed solution is preferably oxidized, by heating it and passing a current of air through it, or in any other suitable manner.

There will thus be produced ammonium sulfate in solution, which can be recovered in the usual way, and a precipitate of insoluble iron hydroxid, which will be practically free from sulfur, as also from cyanids and chlorid, and may be washed and filter pressed and prepared for use as an iron ore or otherwise.

The waste pickling liquor may before being mixed with the gas liquor be partly concentrated or not, and may be oxidized and used hot or not, as desired, and the gas liquor may be concentrated or not, as desired. Obviously, the operations may be made to take place continuously or intermittently, and the manner of conducting the operations and the form of apparatus used may be varied widely.

If the gas liquor contains a proportionately larger amount of sulfids, it may be preferable to omit the preliminary treatment of the gas liquor by which the sulfids are converted into insoluble iron sulfids, and to let the iron sulfids and hydroxids, as also the cyanids and chlorid, precipitate together. The sulfur, cyanogen and chlorin values together with the iron hydroxid can then be recovered by suitable further treatment.

If pickling liquor resulting from the use of hydrochloric or other acid, were used instead of sulfate pickling liquor, analogous re-actions would take place and the results obtained would be substantially the same as when sulfate pickling liquor is used except that the ammonia salt recovered would vary according to the acid contained in the pickling liquor employed.

What is claimed is:—

1. The process of recovering valuable constituents from iron pickling liquor and gas liquor, which consists in mixing the pickling liquor with the gas liquor to form an ammonium salt in solution and iron hydrate, subjecting the mixture to the action of an oxidizing agent to convert the soluble iron hydrate into iron hydrate which is insoluble in the presence of the ammonium salt and thereby causing all the iron to precipitate, separating the precipitate from the solution, and recovering the ammonium salt from the solution, substantially as described.

2. In the process of recovering valuable constituents from iron pickling liquor and gas liquor, the improvement which consists in first treating the gas liquor to precipitate the sulfids in the form of iron sulfids and sulfur, and then mixing with the gas liquor a volume of the pickling liquor containing the proper amount of iron salt to combine with the ammonia in the gas liquor to form an ammonium salt in solution and a precipitate of iron hydrate substantially as described.

3. The process of recovering valuable constituents from iron pickling liquor and gas liquor, which consists in first treating the gas liquor to free it of its sulfids, then mixing with the gas liquor a volume of the pickling liquor containing the proper amount of iron salt to combine with the ammonia in the gas liquor to form an ammonium salt in solution and iron hydrate, subjecting the mixture to the action of an oxidizing agent to convert the soluble iron hydrate into iron hydrate which is insoluble in the presence of the ammonium salt and thereby causing all the iron to precipitate, separating the precipitate from the solution, and recovering the ammonium salt from the solution, substantially as described.

4. In the process of recovering valuable constituents from iron pickling liquor and gas liquor, the improvement which consists in first freeing the gas liquor of its sulfids by adding sufficient pickling liquor to precipitate the sulfids in the form of iron sulfids and sulfur, and then mixing with the gas liquor thus freed of sulfids a volume of pickling liquor containing the proper amount of iron salt to combine with the ammonia contained in the gas liquor to form an ammonium salt in solution and a precipitate of iron hydrate, substantially as described.

5. The process of recovering valuable constituents from iron pickling liquor and gas liquor, which consists in first freeing the gas liquor of its sulfids by adding sufficient pickling liquor to precipitate the sulfids in the form of iron sulfids and sulfur, then mixing with the gas liquor thus freed of sulfids a volume of pickling liquor containing the proper amount of iron salt to combine with the ammonia contained in the gas liquor to form an ammonium salt in solution and iron hydrate, subjecting the mixture to the action of an oxidizing agent to convert the soluble iron hydrate into iron hydrate which is insoluble in the presence of the ammonium salt and thereby causing all the iron to precipitate, separating the precipitate from the solution, and recovering the ammonium salt from the solution, substantially as described.

6. In the process of recovering valuable constituents from iron sulfate pickling liquor and gas liquor, the improvement which consists in mixing the pickling liquor with the gas liquor to form ammonium sulfate in solution and iron hydrate, and subjecting the mixture to the action of an oxidizing agent to convert the soluble iron hydrate into iron hydrate which is insoluble in the presence of ammonium sulfate and thereby causing all the iron to precipitate, substantially as described.

7. The process of recovering valuable constitutents from iron sulfate pickling liquor and gas liquor, which consists in first freeing the gas liquor of its sulfids by adding sufficient of the pickling liquor to precipitate the sulfids in the form of iron sulfids and sulfur, then mixing with the gas liquor thus freed of sulfids a volume of the pickling liquor containing the proper amount of iron sulfate to combine with the ammonia contained in the gas liquor to form ammonium sulfate in solution and iron hydrate, subjecting the mixture to the action of an oxidizing agent to convert the soluble iron hydrate into iron hydrate which is insoluble in the presence of ammonium sulfate and thereby causing all the iron to precipitate, separating the precipitate from the solution, and recovering the ammonium sulfate from the solution, substantially as described.

In testimony whereof, I have hereunto set my hand, in the presence of two subscribing witnesses.

FREDERIC J. FALDING.

Witnesses:
 A. L. KENT,
 J. A. GRAVES.